United States Patent
Kawashima

(10) Patent No.: US 6,804,730 B1
(45) Date of Patent: Oct. 12, 2004

(54) ACCESS CONTROL DEVICE, ACCESS CONTROL METHOD, RECORDING MEDIUM, AND COMPUTER DATA SIGNAL FOR CONTROLLING ALLOWANCE OF ACCESS TO STORAGE AREA USING CERTIFICATION DATA

(75) Inventor: Teruhiro Kawashima, Tokyo (JP)

(73) Assignee: Tokyo Electron Device Limited, Yokohama (JP)

(*) Notice: Subject to any disclaimer, the term of this patent is extended or adjusted under 35 U.S.C. 154(b) by 0 days.

(21) Appl. No.: 09/441,586

(22) Filed: Nov. 17, 1999

(51) Int. Cl.[7] .............................................. G06F 3/00
(52) U.S. Cl. ..................... 710/36; 711/103; 711/100; 711/164; 711/163; 713/150; 713/182; 713/202; 365/202
(58) Field of Search ........................ 710/36; 711/103, 711/100, 164, 163; 713/150, 182, 202; 365/202

(56) References Cited

U.S. PATENT DOCUMENTS

| | | | |
|---|---|---|---|
| 4,758,718 A | * | 7/1988 | Fujisaki et al. ............. 235/487 |
| 5,442,165 A | * | 8/1995 | Atsumi et al. ............. 235/492 |
| 5,857,024 A | * | 1/1999 | Nishino et al. ............. 713/172 |
| 5,978,919 A | * | 11/1999 | Doi et al. ................... 713/202 |
| 6,243,755 B1 | * | 6/2001 | Takagi et al. ............... 709/229 |
| 6,298,421 B1 | * | 10/2001 | Minamizawa et al. ...... 711/151 |

* cited by examiner

Primary Examiner—Jeffrey Gaffin
Assistant Examiner—Niketa Patel
(74) Attorney, Agent, or Firm—Luce, Forward, Hamilton & Scripps LLP

(57) ABSTRACT

A computer supplies an enable command and a password to a controller after a memory card is attached to the computer. The controller allows acceptance of an access command if the supplied enable command and password coincide with those stored in a flash memory, or refuses the acceptance of the access command if the supplied enable command and password differ from those stored in the flash memory. The controller updates the enable command and password if a password setting command and newly prepared enable command and password are supplied to the controller from the computer during access command accept mode. The controller refuses the access command if the computer supplies to the controller a correct enable command but a wrong password during the access command accept mode.

20 Claims, 8 Drawing Sheets

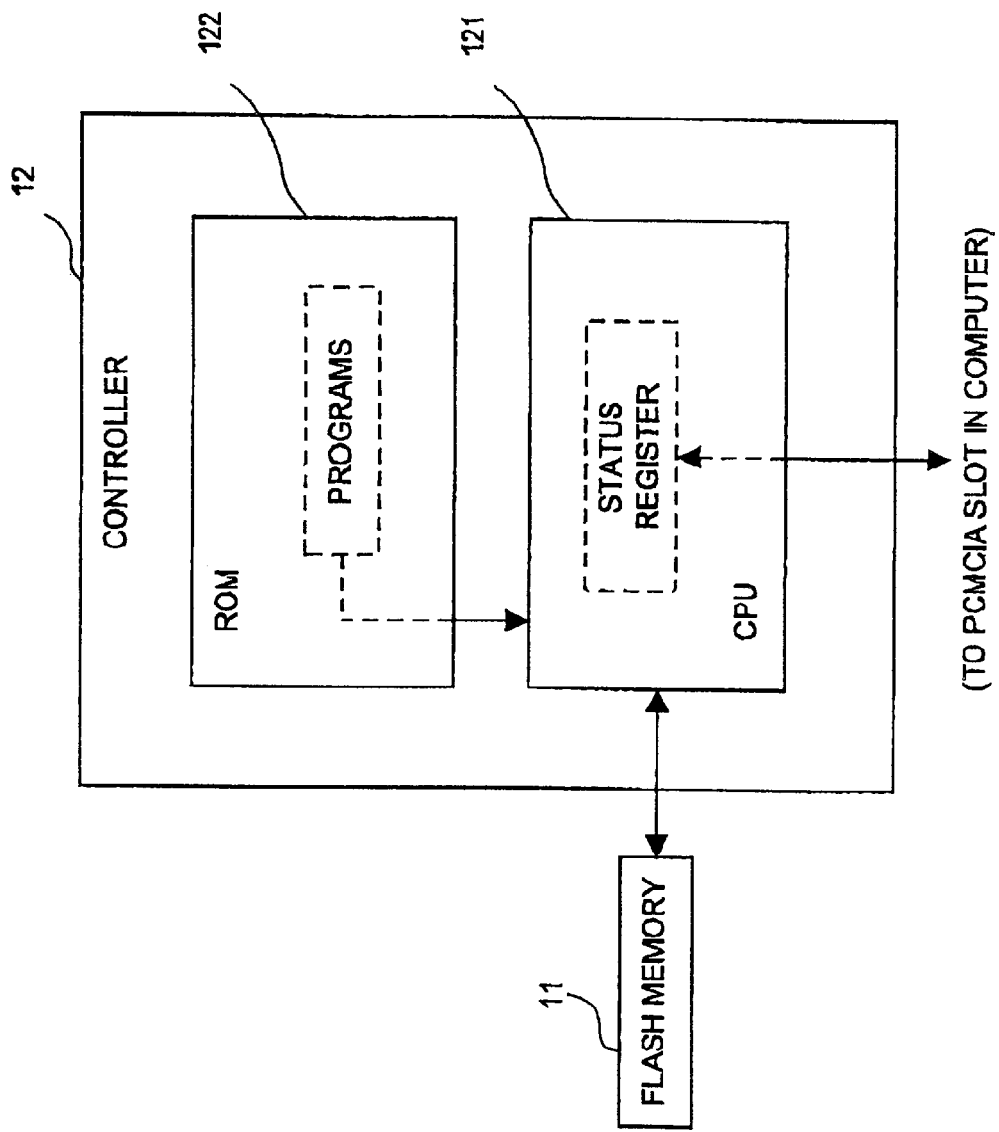

ACCESS CONTROL DEVICE, ACCESS CONTROL METHOD, RECORDING MEDIUM, AND COMPUTER DATA SIGNAL FOR CONTROLLING ALLOWANCE OF ACCESS TO STORAGE AREA USING CERTIFICATION DATA

BACKGROUND OF THE INVENTION

1. Field of the Invention

The present invention relates to a certification system and an access control device, more particularly to a certification system and an access control device which prevent data in a storage device from being exposed.

2. Description of the Related Art

Of late, a memory card having a flash memory module has been used as a portable non-volatile memory device suitable for a portable information terminal.

Usually, a PCMCIA bus interconnects the memory card and a computer or the like. The computer accesses the attached memory card to store data therein or read data therefrom.

Not only a user of the memory card but also anybody else can see the data stored in the memory card in a case where, for example, the memory card is attached to other's computer. Portability risks the memory card to such data exposure.

Data encoding has been known as a method for preventing the data from being exposed, however, it has many disadvantageous matters.

Process for encoding and decoding data is dull, because it requires large number of calculation steps. Fast accessibility of the memory card comes to nothing because of such dull process for the data encoding. Moreover, developers of data encoding software must spend a lot of time in designing the software, because they must prepare the large number of calculation steps.

Delivering the encoded data with the memory card from its user to other person is troublesome, because the encoded data must be decoded by the computer or the like each time. The encoded data is meaningless for one to which the data is delivered, because the data is unreadable unless it is decoded.

SUMMARY OF THE INVENTION

The present invention has been made in consideration of the above, and it is an object of the present invention to provide a certification system which accomplishes data protection for a storage device while keeping its easy handling for data delivery with a simple structure.

To achieve the above object, an access control device according to a first aspect of the present invention is an access control device connected to a storage device which stores and supplies data in response to access, and comprises an erasable/programmable storage area for storing certification data; and an access device which obtains input data, outputs a command for access the storage device, and obtains read-out data supplied in accordance with the command, the access control device determines whether the input data obtained by the access device substantially coincides with predetermined certification data, and allows acceptant of the command output by the access device when the input data coincides with the predetermined certification data;

receives the command output from the access device while the acceptance of the command is allowed, accesses the storage device in accordance with the received command when the received command represents a predetermined access command in order to obtain the read-out data, and supplies the obtained read-out data to the access device; and obtains newly prepared certification data from the access device when the command supplied from the access device represents a predetermined configuration setting command, and stores the obtained certification data to the storage area in the storage device.

Such the storage device connected to the access control device is accessed by the access control device when correct certification data is supplied to the access control device from the access device. Thus, the data stored in the storage device is protected from revelation.

Moreover, software developers can design software for generating and supplying the certification data easier than encoding/decoding software, because of simple structure. Such simplicity helps fast accessibility of the storage device such as the memory.

The access action includes not only data reading from the storage device but also data writing to the storage device.

Therefore, the access device may output to-be-written data to be stored in the storage device.

In this case, the access control device may determine whether the input data obtained by the access device substantially coincides with the certification data, and allows acceptance of the to-be-written data when it is determined that the input data coincides with the certification data; and receives the to-be-written data while the acceptance of the to-be-written data is allowed, writes the to-be-written data in the storage area in the storage device in accordance with the received command when the received command represents the access command which indicates writing of the to-be-written data.

The certification data may comprise an enable command and a password. In this case, the access control device determines whether the input data obtained by the access device substantially includes the enable command and the password while the acceptance of the command output by the access device is refused, and allows the acceptance of the command when it is determined that the input data includes the enable command and the password.

In the case where the certification data may comprise an enable command and a password, the access control device may determine whether the input data obtained by the access device substantially includes the enable command and the password while the acceptance of the command output from the access device is allowed, and refuses the acceptance of the command when it is determined that the input data do not include the enable command and the password.

This structure allows a user to lock the data stored in the storage device so as not to be read by other person even if the storage device is in action. This data protection is effective when, for example, the user leaves the storage device temporarily.

The enable command and the password may be paired while being associated with each other.

In this case, the access control device may determine whether the input data obtained by the access device substantially include a pair of the enable command and the password while the acceptance of the command output by the access device is refused, and allows the acceptance of the command when it is determined that the input data include the pair of the enable command and the password; and may determine whether the input data obtained by the access device substantially include the enable command and the password which is paired with the enable command while the acceptance of the command is allowed, and refuse the acceptance of the command when it is determined that the input data include the enable command but do not include the password which is paired with the enable command.

In this case, a plurality of the enable commands and passwords may be registered.

The access control device may allow the acceptance of the command when the password includes predetermined data whether the input data obtained by said access device includes the enable command and the password or not.

This structure allows a user to read the data stored in the storage device without certification. Thus, the data do not require decoding for delivering the data to other person.

The access control device may determine whether the input data obtained by said access device substantially includes a predetermined command for data salvation, and allows the acceptance of the command output by said access device when the input data includes the predetermined command.

This structure allows a user to have the data stored in the storage device salvaged, even if the user forgets the certification data. The command for the data salvation should be held by limited persons such as ones relating to the manufacturer, thus, the level of the data protection is kept high.

A certification system according to a second aspect of the present invention comprises:

a storage device, an access device and a controller, wherein the storage device comprises an erasable/programmable storage area for storing and supplying certification data in response to access, the access device obtains input data, outputs a command for accessing the storage device, and obtains read-out data supplied from the storage device in accordance with the command, and the controller determines whether the input data obtained by the access device substantially coincide with predetermined certification data, and allows acceptance of the command output by the access device when it is determined that the input data coincide with the certification data;

receives the command output by said access device while the acceptance of the command is allowed, and access the storage device in accordance with the received command if the received command represents a predetermined access command in order to obtain the read-out data, and supplies the obtained read-out data to the access device; and obtains newly prepared certification data from the access device if the command supplied from the access device represents a predetermined configuration setting command, and stores the obtained certification data to the storage area in said storage device.

According to the certification system, the storage area in the storage device is accessed when correct certification data is supplied from the access device. Thus, the data stored in the storage device is protected from reveal.

Moreover, software developers can design software for generating and supplying the certification data easier than encoding/decoding software, because of simple structure. Such simplicity helps fast accessibility of the storage device.

The controller may be detachably connected to the access device.

In this case, the controller may supply identification data for identifying the controller to the access device, and the access device may determine whether the received identification data represent the controller, and outputs the command when it is determined that the received identification data represent the controller.

This structure helps prevent the system from supplying the command to unsuitable controller, because the access to the storage device is allowed after the controller is discriminated.

The access device may determine whether the controller is attached to the access device, and instructs the controller to supply the identification data to the access device when it is determined that the controller is attached to the access device, and the controller may supply the identification data to the access device when the controller is instructed by the access device.

This structure helps prevent the system from trying to supply the identification data to an unattached access device, because the access to the storage device is allowed after the access device is attached to the controller.

The certification data may comprise an enable command and a password.

In this case, the controller may determine whether the input data obtained by the access device substantially include the enable command and the password while the acceptance of the command output by the access device is refused, and may allow the acceptance of the command when it is determined that the input data include the enable command and the password.

The controller may determine whether the input data obtained by the access device substantially include the enable command and the password while the acceptance of the command output by the access device is allowed, and may refuse the acceptance of the command when it is determined that the input data include the enable command but do not include the password.

This structure allows a user to lock the data stored in the storage device so as not to be read by other person even if the storage device being in action. This data protection is effective when, for example, the user leaves the storage device temporarily.

An access control method according to a third aspect of the present invention is a method for controlling access to a storage device comprising an erasable/programmable storage area for storing and supplying certification data in response to the access, comprises the steps of:

obtaining input data, outputting a command for accessing the storage device, determining whether the input data obtained by an access device, which obtains read-out data supplied in accordance with the command, substantially coincide with predetermined certification data, and allowing acceptance of the command output by the access device when it is determined that the input data coincides with the predetermined certification data;

receiving the command output by the access device while the acceptance of the command is allowed, accessing the storage device in accordance with the received command when the received command represents a predetermined access command to obtain the read-out data, and supplying the obtained read-out data to the access device; and obtaining newly prepared certification data from the access device when the command supplied from the access device represents a predetermined configuration setting command, and storing the obtained certification data to the storage area in the storage device.

According to such the access control method, the storage area in the storage device is accessed when correct certification data is supplied from the access device. Thus, the data stored in the storage device is protected from reveal.

Moreover, software developers can design software for generating and supplying the certification data easier than encoding/decoding software, because of simple structure. Such simplicity helps fast accessibility of the storage device.

A computer readable recording medium storing a program according to the fourth aspect of the present invention, causes a computer to act as:

a storage device having an erasable/programmable storage area for storing and supplying certification data in response to access;

an access device for obtaining input data, outputting a command for accessing the storage device in order to obtain read-out data output in accordance with the command; and a controller for determining whether the input data obtained by the access device substantially coincide with predetermined certification data; allowing acceptance of the command output by the access device when it is determined that the input data coincide with the predetermined certification data; receiving the command output by the access device while the acceptance of the command is allowed, accessing the storage device in accordance with the received command when the received command represents a predetermined access command in order to obtain the read-out data; supplying the obtained read-out data to the access device; obtaining newly prepared certification data from said access device when the command supplied from the access device represents a predetermined configuration setting command; and storing the obtained certification data to the storage area in the storage device.

According to the computer which executes the program stored in such the recording medium, the storage area in the storage device is accessed when correct certification data is supplied from the access device. Thus, the data stored in the storage device is protected from reveal.

Moreover, software developers can design software for generating and supplying the certification data easier than encoding/decoding software, because of simple structure. Such simplicity helps fast accessibility of the storage device.

A computer readable data signal representing program code embodied in a carrier wave according to the fifth aspect of the present invention, causes a computer to act as:

a storage device having an erasable/programmable storage area for storing and supplying certification data in response to access;

an access device for obtaining input data, outputting a command for accessing the storage device in order to obtain read-out data output in accordance with the command; and a controller for determining whether the input data obtained by the access device substantially coincide with predetermined certification data; allowing acceptance of the command output by the access device when it is determined that the input data coincide with the predetermined certification data; receiving the command output by the access device while the acceptance of the command is allowed, accessing the storage device in accordance with the received command when the received command represents a predetermined access command in order to obtain the read-out data; supplying the obtained read-out data to the access device; obtaining newly prepared certification data from said access device when the command supplied from said access device represents a predetermined configuration setting command; and storing the obtained certification data to the storage area in said storage device.

According to the computer which executes the program represented by such the data signal, the storage area in the storage device is accessed when correct certification data is supplied from the access device. Thus, the data stored in the storage device is protected from reveal.

Moreover, software developers can design software for generating and supplying the certification data easier than encoding/decoding software, because of simple structure. Such simplicity helps fast accessibility of the storage device.

BRIEF DESCRIPTION OF THE DRAWINGS

These objects and other objects and advantages of the present invention will become more apparent upon reading of the following detailed description and the accompanying drawings in which:

FIG. 3 is a block diagram showing the structure of a controller;

DETAILED DESCRIPTION OF THE PREFERRED EMBODIMENT

An embodiment of the present invention will now be described with reference to accompanied drawings. In this embodiment, a certification system comprising a memory card and a computer will be exemplified.

Figure 1:
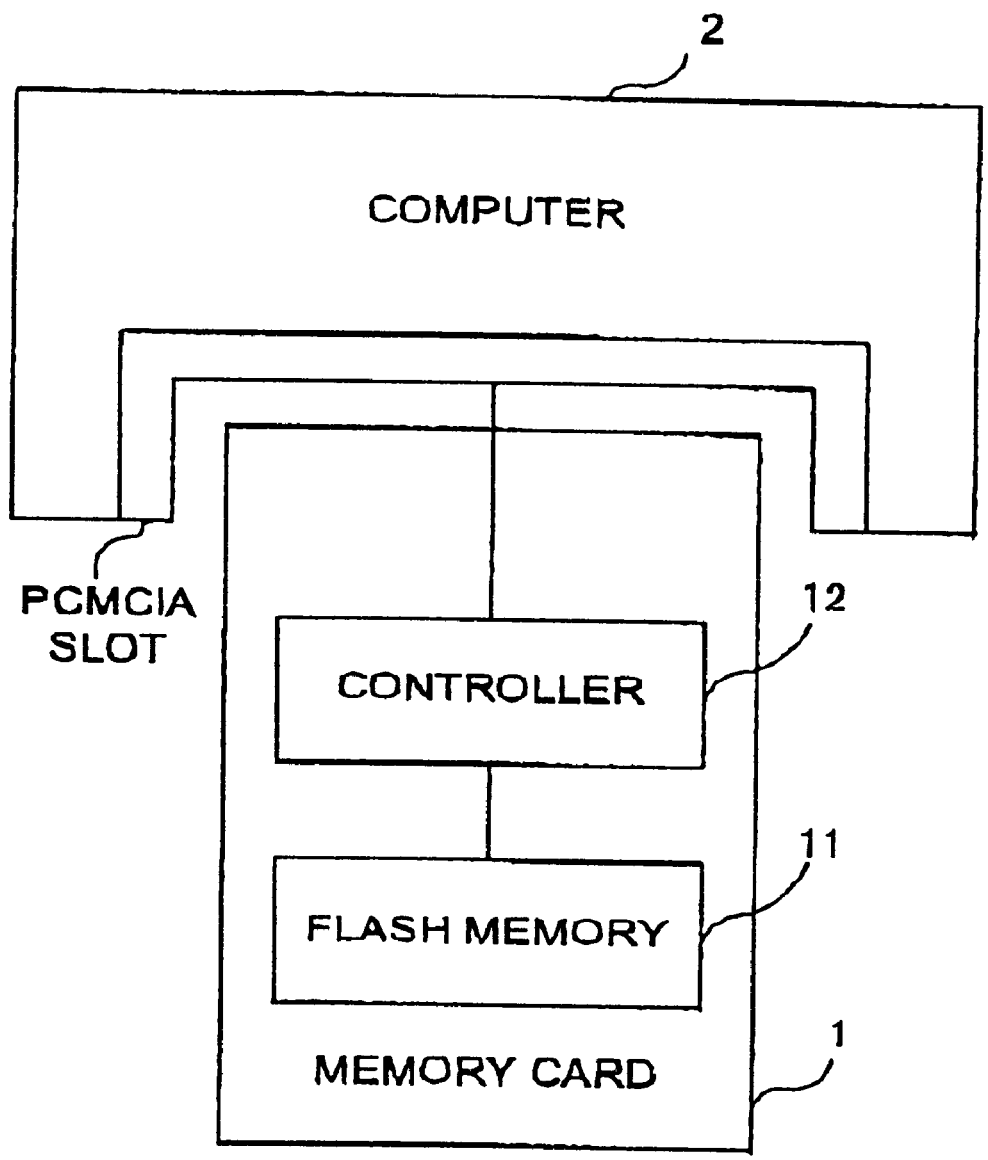
FIG. 1 is a block diagram showing the structure of a certification system according to an embodiment of the present invention.

FIG. 1 is a block diagram showing the physical structure of the certification system according to this embodiment.

As illustrated, the certification system comprises a memory card 1 and a computer 2. The computer 2 has a slot to which the memory card 1 is detachably inserted, and interconnects the inserted memory card 1 and the computer 2.

The slot is, for example, a PCMCIA slot which works as a connector for a PCMCIA bus.

The memory card 1 comprises a flash memory 11 and a controller 12. The flash memory 11 comprises an EEPROM (Electrically Erasable/Programmable Read Only Memory) module, or the like. The controller 12 accesses the flash memory 11 to control the flash memory 11 so as to store data from the computer 2, supplies the stored data to the computer 2, and erases the stored data.

Figure 2:
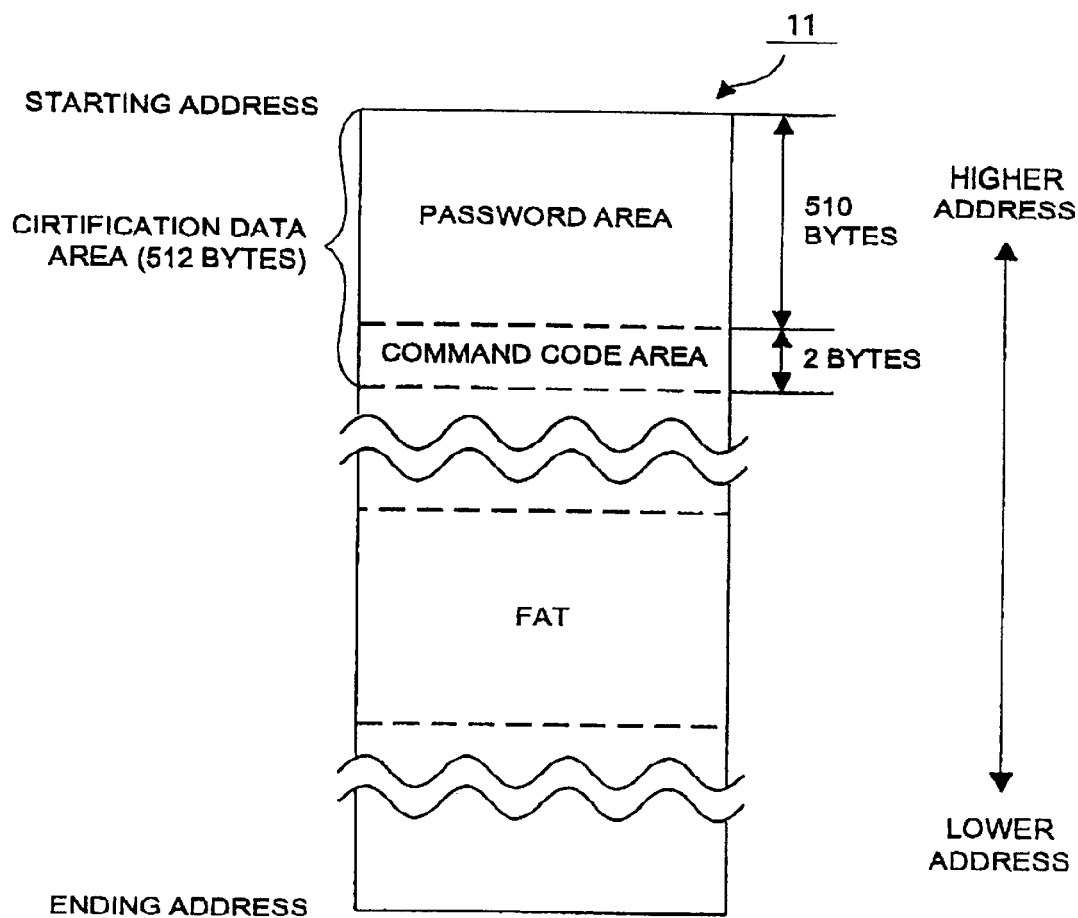
FIG. 2 is a diagram schematically showing the data structure in a flash memory.

Each of storage areas given in the flash memory 11 has assigned address. As shown in FIG. 2, a certification data area is prepared. Capacity of the certification data area is 512 bytes from starting address.

The certification data area has two areas, a password area and a command code area as shown in FIG. 2. Capacity of the password area is 510 bytes from the starting address, and that of the command area following the password area is 2 bytes. The password area stores a later-described password, and the command code area stores a later-described enable command.

The flash memory 11 also stores an FAT (File Allocation Table) which contains data representing the data structure of the storage areas in the flash memory 11.

The controller 12 works as an access control device, and comprises a CPU (Central Processing Unit) 121 and a ROM (Read Only Memory) 122 as shown in FIG. 3.

The CPU 121 is connected to both the ROM 122 and the flash memory 11. The PCMCIA slot on the computer 2 detachably interconnects the CPU 121 and the computer 2. The CPU 121 comprises status register. The ROM 122 stores programs to be executed by the CPU 121.

The CPU 121 executes the programs stored in the ROM 122 in accordance with commands represented by command data supplied from the computer 2.

There are four kinds of commands which activate the CPU 121 to execute the programs. Those four kinds of commands are an enable command, a manufacturer identification command, a password setting command, and an access command.

The enable command instructs the CPU 121 to allow the computer 2 to access the flash memory 11. As mentioned above, the command code area in the flash memory 11 stores the code representing the enable command.

When the CPU 121 receives the enable command supplied from the computer 2, it determines whether it should accept a further supplied access command (described later) or not. The CPU 121 accepts or refuses the access command in accordance with the determination.

In other words, the CPU 121 allows itself to accept the access command from the computer 2 when t he received command data represents the enable command.

The CPU 121 will accept the access command from the computer 2 unconditionally when a predetermined condition applied to the data contained in the password area in the flash memory 11 is satisfied (for example, all bits in the password area represent "1").

The CPU 121 will also accept the access command from the computer 2 unconditionally when a predetermined manufacturer identification command is supplied to the CPU 121 from the computer 2.

The manufacturer identification command is prepared for emergency situation where a user forgets the enable command or the password. In such a case, the manufacturer of the CPU 121 or the like reads the data stored in the flash memory 111 with using the manufacturer identification command. The code representing the manufacturer identification command is previously registered by the manufacturer of the CPU 121.

In a case where the CPU 121 accepts the access command from the computer 2, the CPU 121, for example, sets the status register therein. The CPU 121 informs the computer 2 that the status register is set, thus, the computer 2 is informed that the CPU 121 is now ready to accept the access command.

On the contrary, the CPU 121 resets the status register when it determines that it will refuse the access command. In the same manner as the command acceptance, the computer 2 is informed that the CPU 121 will refuse the access command.

The password setting command is prepared for updating the enable command and password. The code representing the password setting command is previously registered by the manufacturer of the controller 12.

When the CPU 121 receives the password setting command from the computer 2 during the access command accept mode which allows acceptance of the access commands, the CPU 121 updates the code representing the enable command and password stored in the certification data area of the flash memory 11 by executing later-described steps.

The access command allows the CPU 121 to access the flash memory 11. The access command, which corresponds to, for example, the ATA commands or the like, is previously registered by the manufacturer or the like.

When the CPU 121 receives the access command from the computer 2 during the access command accept mode, the CPU 121 accesses the flash memory 11 in accordance with the contents of the supplied access command.

More precisely, accessing the flash memory 11 means storing target data from the computer 2 in the flash memory and/or reading data in the flash memory 11 to supply it to the computer 2.

The CPU 121 also supplies attribution data to the computer 2 in response to a request from the computer 2. The attribution data is prepared for discriminating the memory card 1 to which the CPU 121 belongs.

A personal computer or the like, having the ordinary structure such as a display unit and input device, works as the computer 2. The computer 2 comprises the PCMCIA slot and stores the operating system (OS), a driver program, and programs for causing the computer 2 to execute the certification.

The operations of the computer 2 are controlled by the OS that the computer 2 runs. In accordance with the OS, the computer 2 detects that the memory card 1 is inserted to the PCMCIA slot and invokes the driver program. The computer 2, under a control of the OS, also invokes the certification program in accordance with a user's instruction. Under control of the running certification program, the computer 2 sends to the controller 12 a request for accepting the access command which will be followed (detailed processing will be described later).

Under a situation where the access command is acceptable, the computer 2 controls the CPU 121 to access the flash memory 11 in accordance with the driver program. More precisely, the computer 2 supplies the access command and data to be stored in the flash memory 11 to the controller 12. Or, the computer 2 controls the CPU 121 to read data, in accordance with the supplied access command, from the flash memory 11 so as to be supplied to the computer 2.

[Operations]

Operations of the certification system will now be described with reference to FIGS. 4A to 6B.

Figures 4A, 4B:
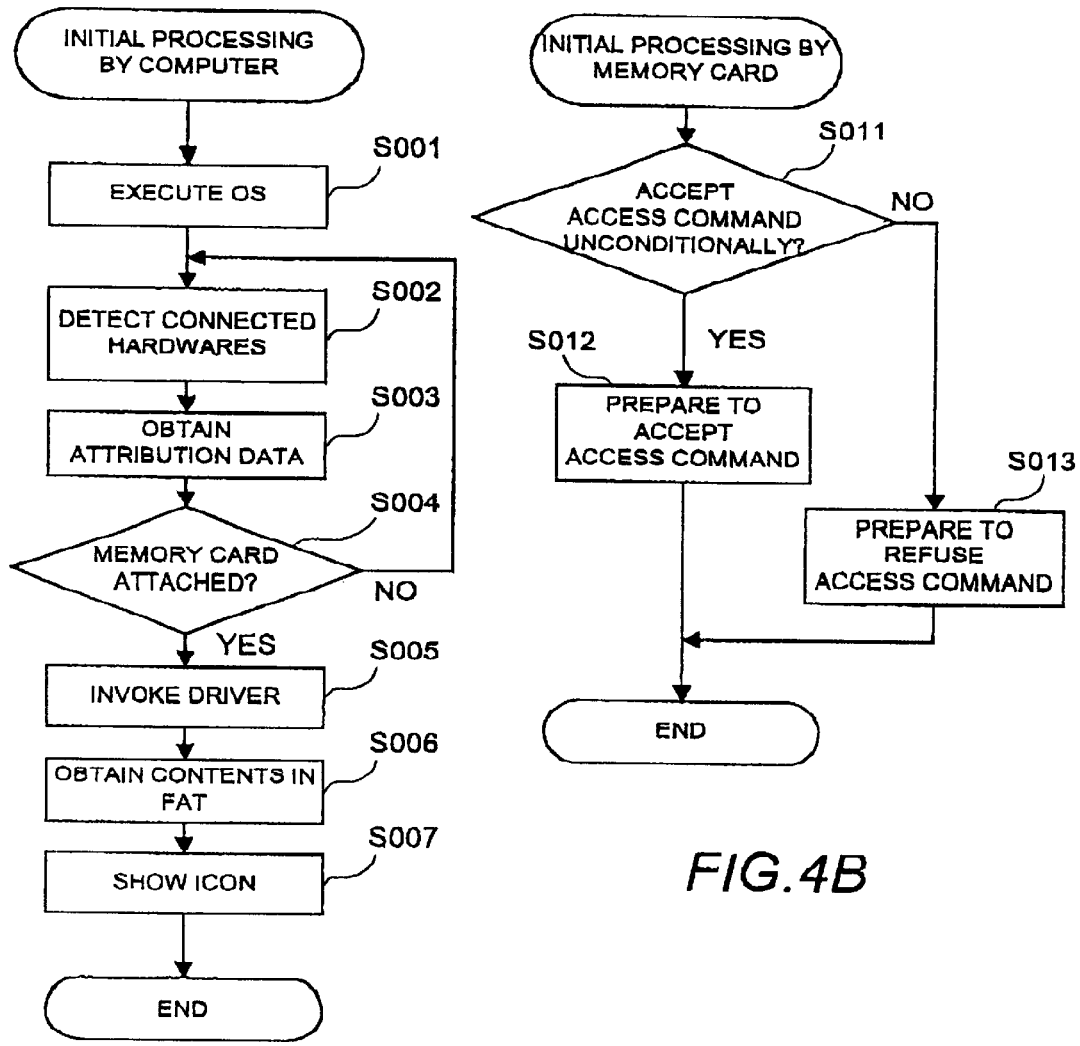
FIG. 4A is a flowchart showing steps of initial processing carried out by a computer.
FIG. 4B is a flowchart showing steps of the initial processing carried out by a memory card.

FIGS. 4A and 4B are flowcharts showing steps of initial processing.

Figure 5A:
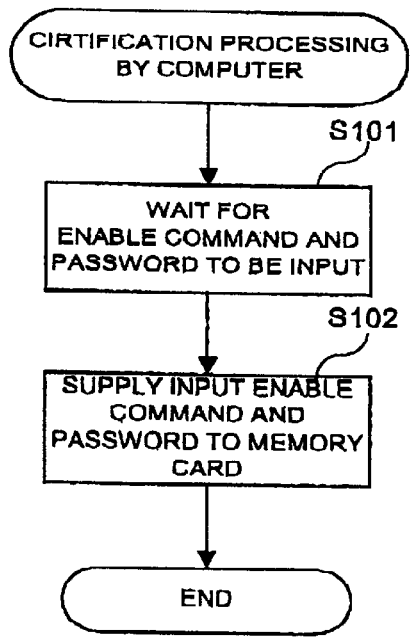
FIG. 5A is a flowchart showing steps of certification processing carried out by the computer.
Figure 5B:
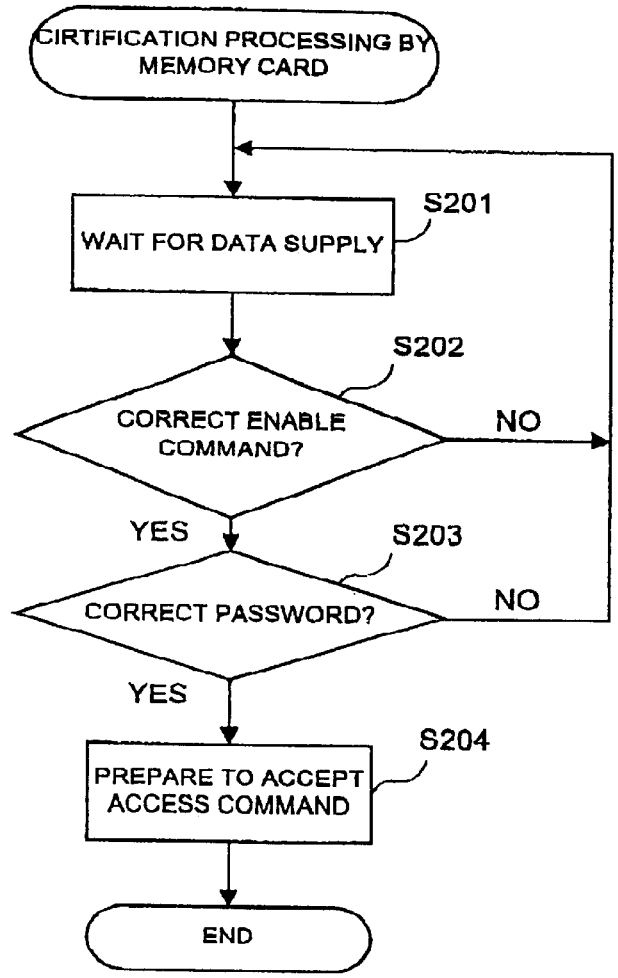
FIG. 5B is a flowchart showing steps of the certification processing carried out by the memory card.

FIGS. 5A and 5B are flowcharts showing steps of certification processing.

Figures 6A, 6B:
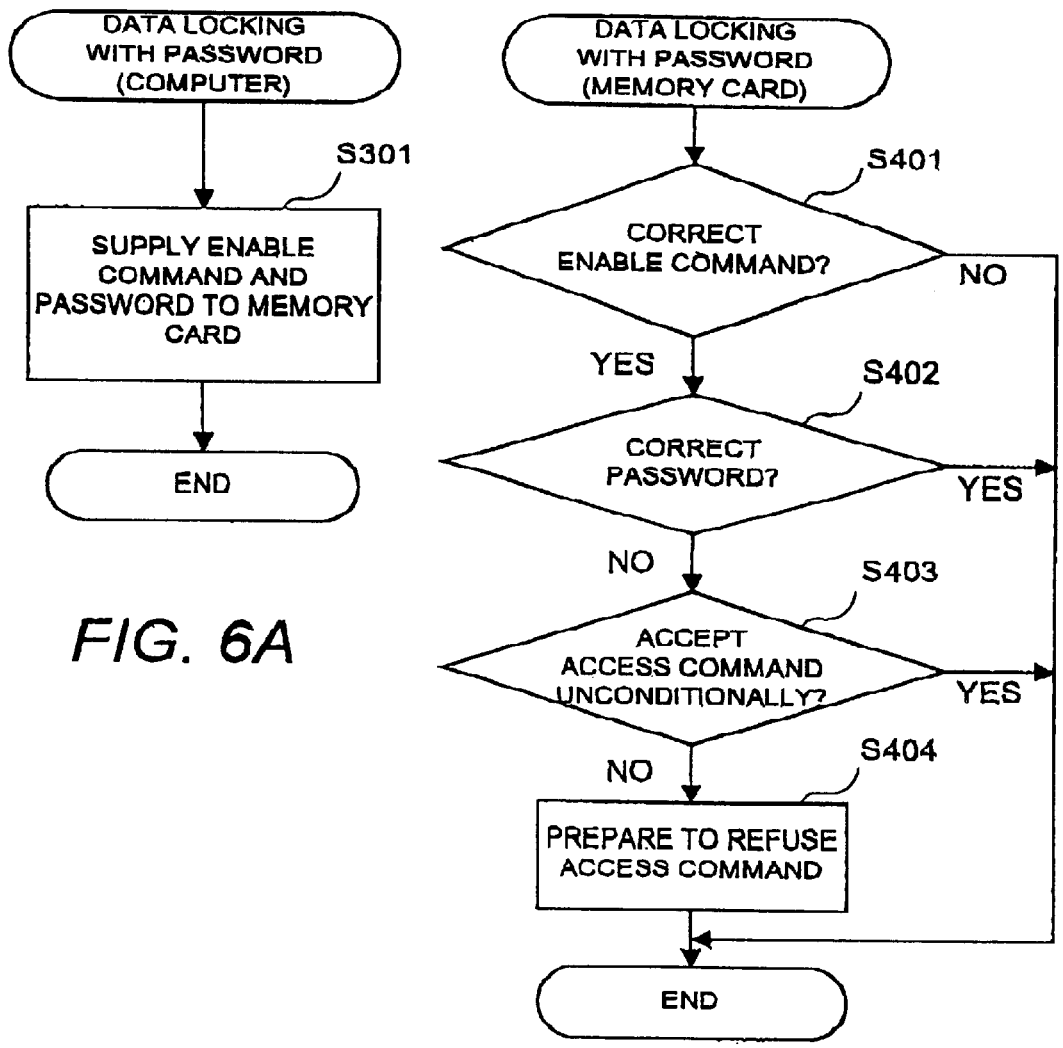
FIG. 6A is a flowchart showing steps of locking the data with a password carried out by the computer.
FIG. 6B is a flowchart showing the steps of locking the data with the password carried out by the memory card.

FIGS. 6A and 6B are flowcharts showing steps of locking the data with a password.

[Initial Processing]

The computer 2 starts the initial processing shown in FIG. 4A after it is booted. Simultaneously, the memory card carries out the initial processing shown in FIG. 4B.

More precisely, the computer 2 executes the OS after the booting processing (step S001). Then, the computer 2 discriminates whether the memory card 1 is inserted to the PCMCIA slot or not in accordance with the running OS.

In response to the insertion of the memory card 1 to the PCMCIA slot, the computer 2 detects the insertion of hardware (step S002). The computer 2 access the controller 12 in the memory card 1 to request to supply the attribution data to the computer 2. In response to the request, the controller 12 supplies the attribution data to the computer 2, and the computer 2 receives it (step S003).

The computer 2 analyzes the supplied attribution data whether it represents the memory card 1 (step S004). More precisely, the computer 2 determines whether the memory card 1 is correct one or not by analyzing whether the supplied attribution data coincides with attribution data prepared by the manufacturer which is given to memory cards meeting the predetermined standard.

If the computer 2 determines that the supplied attribution data does not represent the memory card 1, the flow goes back to step S002. However, if the supplied attribution data represents another device which is applicable by the computer 2, the computer 2 recognizes that the device is attached and starts predetermined processing prepared for using that device.

When the computer 2 determines in step S004 that the supplied attribution data represents the memory card 1, the computer 2 invokes the driver program (step S005).

Simultaneously, the CPU 121 of the controller 12 in the memory card 1 reads the contents in the password area of the flash memory 1 after the memory card 1 is inserted to the PCMCIA slot. The CPU 121 determines whether the read contents satisfies a predetermined condition for accepting the access command unconditionally (step S011).

If it is determined that the condition is satisfied, the CPU 121 terminates its initial processing after shifting the mode to the access command accept mode (step S012), that is, waits for data from the computer 2 including the access command and the like.

If it is determined that the condition is not satisfied, the CPU 121 terminates its initial processing after shifting the mode to the access command refuse mode in which the CPU 121 refuses access commands from the computer 2 (step S013).

After the CPU 121 turns its mode into the access command accept mode in step S012, the computer 2 supplies to the CPU 121 the access command which indicates to the CPU 121 to read the data in the FAT. The CPU 121 reads the contents of the FAT in accordance with the supplied access command, and supplies the read data to the computer 2. The computer 2 receives the FAT contents from the CPU 121, so that the computer 2 is informed of the data structure of the storage areas in the flash memory 11 (step S006).

Then the computer 2 displays an icon on the display unit (step S007) and terminates its initial processing. The icon indicates that the flash memory 11 is now being in access stand-by mode in which the flash memory 11 allows accesses in accordance with the access command from the computer 2.

After displaying the icon, the computer 2 is prepared to allow the controller 12 to access the flash memory 11. More precisely, the computer 2 supplies the access command and the like to the controller 12 in accordance with the user's instruction or the application program executed by the computer 2 in order to cause the controller 12 to access the flash memory 11.

[Certification Processing]

The computer 2 invokes the certification program in accordance with the user's instruction after the activation of the driver program.

The certification processing caused by the computer 2 (that is, steps controlled by the certification program while the CPU 121 of the controller 12 in the memory card 1 is in access command refuse mode) will now be described with reference to FIG. 5A. And, operations of the memory card 1 while the computer 2 executes the certification program will now be described with reference to FIG. 5B.

After the certification program is executed, the computer 2 asks the user to input the enable command and password (step S101). More precisely, the computer 2, for example, displays on the display unit a text input area to which the enable command and password are input.

In response to the input of data representing the enable command and password, the computer 2 supplies the data input as the enable command and password to the controller 12 in the memory card 1 (step S102).

The memory card 1 waits for the data supply from the computer 2 (step S201). In response to the data reception, the CPU 121 of the controller 12 in the memory card 1 analyzes whether the enable command in the supplied data coincides with the code representing the enable command stored in the command code area in the flash memory 11 (step S202).

If the CPU 121 determines that the enable commands do not coincide with each other, the CPU 121 ignores the supplied data and the flow goes back to step S201.

When it is determined in step S202 that the supplied enable command coincides with the stored enable command, the CPU 121 analyzes whether the password in the data supplied from the computer 2 coincides with a password stored in the password area in the flash memory 11 (step S203).

If the CPU 121 determines that the supplied password does not coincide with the stored password, the CPU 121 ignores the supplied data and the flow goes back to step S201. As a result, the CPU 121 is still in the access command refuse mode.

On the contrary, if it is determined that the passwords coincide with each other, the CPU 121 prepares to accept the access command supplied from the computer 2 (step S204). And then, the CPU 121 terminates the certification processing and waits for data including the access command and the like supplied from the computer 2.

After the CPU 121 turns its mode into the access command accept mode in step S204, the computer 2 carries out processing which is substantially the same as that carried out in steps S006 and S007. That is, the computer 2 receives the contents in the FAT to see the data structure of the storage areas in the flash memory 11 and displays the icon.

Thus, the computer 2 enables the CPU 121 to access the flash memory 11.

[Updating Enable Command and Password]

In order to update the enable command and password, the computer 2, for example, supplies the password setting command to the controller 12 in accordance with the running certification program while the CPU 121 of the controller 12 is in the access command accept mode.

More precisely, the computer 2, which executes the certification program or the like, asks the user to input newly prepared enable command and password. For example, the computer 2 displays text input area to which the new enable command and password are input.

After the user input the new enable command and password, the computer 2 supplies the password setting command and the input enable command and password to the controller 12.

The CPU 121 of the controller 12 receives the password setting command, the new enable command and password, and writes the received enable command to the command code area in the flash memory 11 and writes the received password to the password area in the flash memory 11.

Thus, the enable command and password are updated.

The user may change the password so as to satisfy the condition for accept the access command from the computer 2 unconditionally with the above update processing in order to make the data stored in the flash memory 11 readable without the user's certification.

In this case, one who does not know the enable command may read the data stored in the flash memory 11 with using not only the computer 2 but also an available computer.

[Processing for Data Locking with Password]

Even if the CPU 121 of the controller 12 is in the access command accept mode, the computer 2 is able to supply the enable command and password to the CPU 121 in accordance with the certification program.

In this case, the user may intentionally input a correct enable command and a wrong password with the computer 2 in order to turn the mode of the CPU 121 into the access command refuse mode.

A correct enable command and a correct password are required to turn the mode of the CPU 121 into the access command accept mode again (that is, the data is locked with the password).

This function prevents the data stored in the flash memory 11 from being stolen by other persons in a case where the user leaves the computer 2 for a while.

The processing for locking data in the flash memory 11 with the password will now be described with reference to FIGS. 6A and 6B.

The computer 2 carries out processing which is substantially the same as that carried out in steps S101 and S102. Thus, data including an enable command and a password input by the user are supplied to the controller 12 in the memory card 1 (step S301).

In response to the data supply from the computer 2, the CPU 121 of the controller 12 carries out processing which is substantially the same as that carried out in step S202. That is, the CPU 121 determines whether the enable command in the supplied data coincides with the enable command stored in the flash memory 11 (step S401).

If it is determined that the supplied enable command does not coincide with the stored enable command, the CPU 121 ignores the supplied data, terminates the processing, and waits for other data supplied from the computer 2.

If it is determined that the supplied enable command coincides with the stored enable command, processing which is substantially the same as that carried out in step S203 is carried out by the CPU 121. That is, the CPU 121 determines whether the password in the data supplied from the computer 2 coincides with the password stored in the flash memory 11 (step S402).

If it is determined that the supplied password coincides with the stored password, the CPU 121 ignores the supplied data from the computer 2, terminates the processing, and waits for further data supplied from the computer 2.

On the contrary, if it is determined that the supplied password does not coincide with the stored password, the CPU 121 further analyzes whether the password stored in the flash memory 11 satisfies the condition for unconditional access command acceptance (step S403).

If it is determined that the stored password satisfies the condition, the CPU 121 ignores the data supplied from the computer 2, terminates the processing, and waits for further data supplied from the computer 2.

If it is determined that the stored password does not satisfy the condition, the CPU 121 turns its mode into the access command refuse mode (step S404), and terminates the processing. And then, the CPU 121 waits for further data supplied from the computer 2.

Thus, the data in the flash memory 11 is locked with the password so as to be protected from being read by others.

The structure of this certification system is not limited to the embodiment described above.

For example, the memory module for the flash memory 11 is not limited to the EEPROM. The flash memory 11 may employ an arbitrary erasable/programmable memory module which can stores and outputs data in response to access by the CPU 121 or other arbitrary devices.

For more effective data protection, the memory card should employ the tamper free structure which allows the data in the flash memory 11 to vanish away when the memory card I is crushed physically.

The enable command and password may be stored in the storage areas in the flash memory that correspond to arbitrary addresses. In this case, the controller 12, for example, stores the addresses of the enable command and password.

The data lengths of the enable command and password are not restricted.

The flash memory 11 may store a plurality of enable commands and passwords or, for example, a plurality of pairs of the enable command and password. In this case, the access command accept mode may be activated during the above described certification processing only when an enable command and a password input by the user coincides with stored enable command and password which are paired.

The slot on the computer 2 may be attached to the computer 2 detachably.

Figure 7:
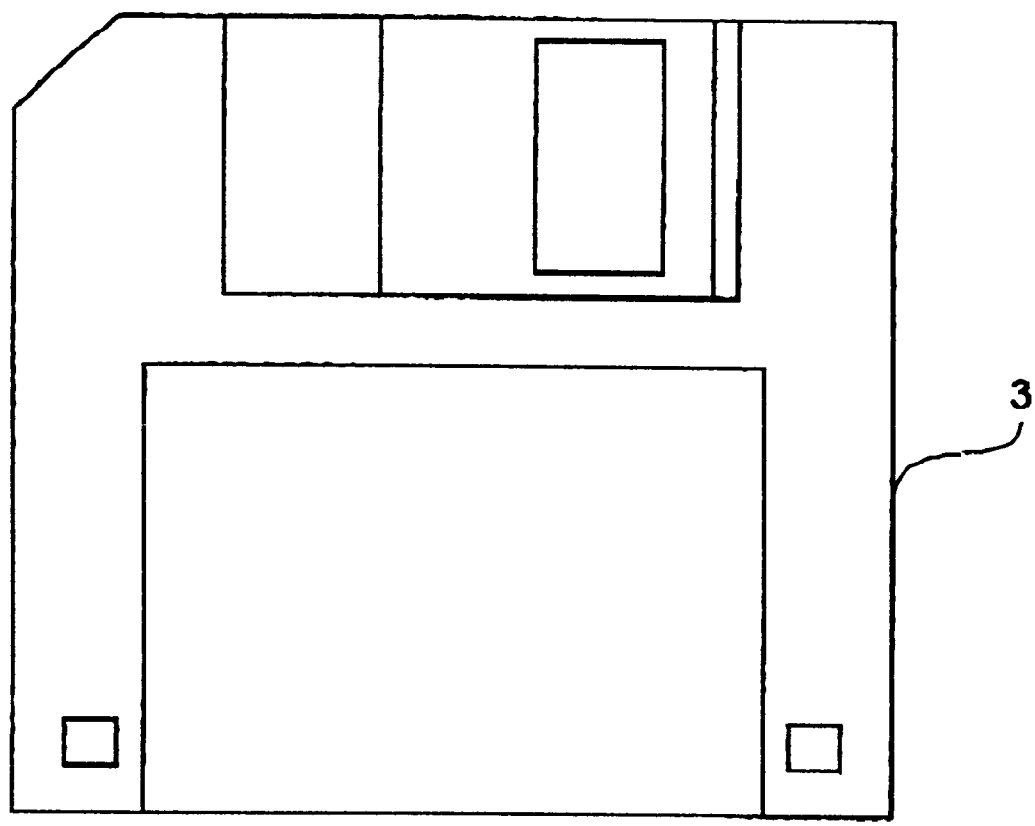
FIG. 7 is a diagram showing a floppy disk containing programs which accomplish the embodiment of the present invention with using the computer.

The certification system described in the above embodiment may be accomplished with not only a single purpose system but also an ordinary computer system. For example, the program which realizes the above described processing may be installed to a computer having an external storage device from a medium (a floppy disk shown in FIG. 7, a CD-ROM, or the like), thus, the computer works as the certification system which executes the above described processing.

Figure 8:
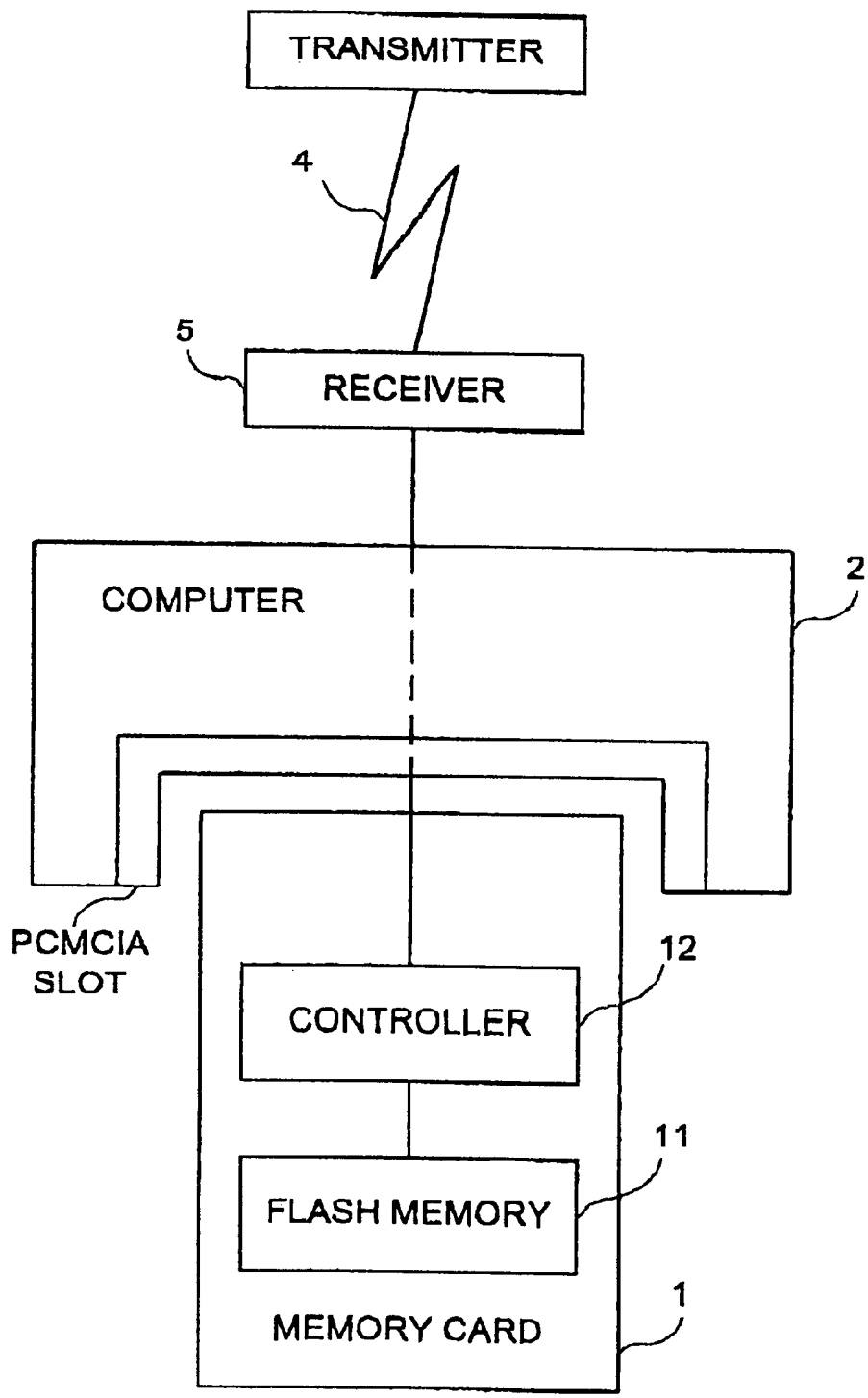
FIG. 8 is a diagram showing the structure in case where a carrier wave containing the programs which accomplish the embodiment of the present invention is distributed.

The program may be distributed to the computer via the telecommunication system using a telephone line, a communication network, or the like which merely helps data transfer without retaining it permanently. For example, the program may be uploaded on a BBS (Bulletin Board System) for distributing it via a communication network. Or, distribution of the program may be realized by modulation wave transmission exemplified in FIG. 8. In this case, a modulation wave 4 is prepared by modulating a carrier wave by the program, and transmitted modulation wave is distributed to computer 2 or the controller 12 via a receiver 5.

And then, the distributed program is invoked so as to be executed like other application programs under a control of the OS, thus, the above described processing is carried out.

If the OS helps the above processing or the OS acts as a part of the structure of the present invention, the program stored in a recording medium may include only essential parts without the parts owned by the OS. This case also allows the recording medium to store the program which causes the computer to execute functions and/or steps.

According to the above described present invention, a certification system which protects data stored in a storage device from being exposed without losing easy handling for data transfer.

The present invention is not limited to the embodiment described above, but may be modified as needed.

The entire disclosure of Japanese Patent Application No. H10-150188 filed on May 29, 1998, including specification, claims, drawings and summary, are incorporated herein by reference in its entirety.

What is claimed is:

1. An access control device connected to:
   a storage device which stores and supplies data in response to access, and comprises a certification data storage area for rewritably storing certification data; and
   an access device which has functions of outputting input certification data, and at least one of a storage device access command or a setting change command instructing rewriting of certification data, and a function of obtaining read-out data supplied in accordance with the access command;
   said access control device receiving the input certification data output by said access device, determining whether the certification input data coincides with the certification data stored in said certification data storage area, and allowing acceptance of the access command and the setting change command output by said access device when determining that the input certification data coincides with the certification data;
   receiving the access command or the setting change command output from said access device while the acceptance of the access command and the setting change command is allowed;
   accessing said storage device in accordance with the received access command, and supplying the read-out data obtained from said storage device in accordance with this accessing to said access device; and
   obtaining new certification data output from said access device in accordance with the received setting change command, and rewriting the certification data stored in said certification data storage area into the new certification data obtained from said access device.

2. The access control device according to claim 1, wherein said access device further has a function of outputting to-be-written data to be stored in said storage device,
   wherein said access control device also receives the to-be-written data output from said access device while the acceptance of the access command is allowed; and
   when receiving the to-be-written data and the access command of instructing writing of the to-be-written data, writes the to-be-written data in a storage area of said storage device in accordance with the access command.

3. The access control device according to claim 2, wherein the certification data comprises an enable code and a password, and
   said access control device determines whether the input certification data output from said access device includes an enable code and a password which are identical to those included in the certification data while the acceptance of the access command or the setting change command is refused, and allows the acceptance of the access command and the setting change command when it is determined that the input certification data includes such an enable code and a password.

4. The access control device according to claim 3, wherein said access control device determines whether the input certification data output by said access device includes an enable code and a password which are identical to those included in the certification data while the acceptance of the access command or the setting change command is allowed, and refuses the acceptance of the access command or the setting change command when it is determined that the input certification data includes such an enable code and does not include such a password.

5. The access control device according to claim 3, wherein said access control device allows the acceptance of the access command and the setting change command regardless of whether the input certification data output by said access device includes an enable code and a password which are identical to those included in the certification data or not, when the password included in the certification data includes predetermined data.

6. The access control device according to claim 3, wherein said access control device supplies identification data for identifying said controller to said access device, and
   said access device obtains the identification data, determines whether said access control device is controllable by said access device based on the identification data, and stops the function of outputting the input certification data, and the access command or the setting change command when it is determined that said access control device is not controllable.

7. The access control device according to claim 1, wherein the certification data comprises an enable code and a password, and
   said access control device determines whether the input certification data output from said access device includes an enable code and a password which are identical to those included in the certification data while the acceptance of the access command or the setting change command is refused, and allows the acceptance of the access command and the setting change command when it is determined that the input certification data includes such an enable code and a password.

8. The access control device according to claim 7, wherein said access control device determines whether the input certification data output from said access device includes an enable code and a password which are identical to those included in the certification data while the acceptance of the access command or the setting change command is allowed, and refuses the acceptance of the access command or the setting change command when it is determined that the input certification data includes such an enable code but does not include such a password.

9. The access control device according to claim 7, wherein the certification data includes a plurality of pairs each made of an enable code and a password, and said access control device determines whether the input certification data output from said access device includes any pair identical to one included in the certification data while the acceptance of the access command or the setting change command is refused, and allows the acceptance of the access command and the setting change command when it is determined that the input certification data includes any such pair; and determines whether the input certification data output from said access device includes any enable code identical to one included in the certification data and a password which is paired with this enable code while the acceptance of the access command and the setting change command is allowed, and refuses the acceptance of the access command or the setting change command when it is determined that the input certification data includes any such enable code but does not include a password which is paired with this enable code.

10. The access control device according to claim 7, wherein said access control device allows the acceptance of the access command and the setting change command regardless of whether the input certification data output from said access device includes an enable code and a password which are identical to those included in the certification data or not, when the password included in the certification data includes predetermined data.

11. The access control device according to claim 1, wherein said access control device supplies identification data for identifying said controller to said access device, and said access device obtains the identification data, determines whether said access control device is controllable by said access device based on the identification data, and stops the function of outputting the input certification data, and the access command or the setting change command when it is determined that said access control device is not controllable.

12. A certification system comprising:

a storage device, an access device and a controller, wherein said storage device stores and supplies data in response to access, and comprises a certification data storage area for rewritably storing certification data, said access device has a function of outputting input certification data, and at least one of access commands for accessing said storage device or a setting change command for rewriting the certification data, and a function of obtaining read-out data supplied in accordance with the access command, and said controller receives the input certification data output from said access device, determines whether the input certification data coincides with the certification data stored in said certification data storage area, and allows acceptance of the access command and the setting change command output by said access device when it is determined that the input certification data coincide with the certification data;

receives the access command or the setting change command output by said access device while the acceptance of the access command and the setting change command is allowed;

accesses said storage device in accordance with the received access command, and supplies the read-out data obtained from said storage device by this accessing to said access device; and obtains new certification data output from said access device in accordance with the received setting change command, and rewrites the certification data stored in said certification data storage area into the new certification data obtained from said access device.

13. The certification system according to claim 12, wherein said controller is detachably connected to said access device.

14. The certification system according to claim 13, wherein said controller supplies identification data for identifying said controller to said access device, and said access device obtains the identification data, determines whether said controller is controllable by said access device based on the identification data, and stops the function of outputting the input certification data, and the access command or the setting change command when it is determined that said controller is not controllable.

15. The certification system according to claim 14, wherein said access device determines whether said controller is attached to said access device, and instructs said controller to supply the identification data to said access device when it is determined that said controller is attached to said access device, and said controller supplies the identification data to said data access device when said controller is instructed by said access device.

16. The certification system according to claim 12, wherein the certification data comprise an enable code and a password; and said controller determines whether the input certification data output from said access device includes an enable code and a password which are identical to those included in the certification data while the acceptance of the access command or the setting change command is refused, and allows the acceptance of the access command and the setting change command when it is determined that the input certification data includes such an enable code and a password.

17. The certification system according to claim 12, wherein said controller determines whether the input certification data output from said access device includes an enable code and a password which are identical to those included in the certification data while the acceptance of the access command or the setting change command is allowed, and refuses the acceptance of the access command or the setting change command when it is determined that the input certification data includes such an enable code but does not include such a password.

18. An access control method for controlling access to a storage device storing and supplying data in response to access and comprising a certification data storage area for rewritably storing certification data, said method comprising the steps of:

obtaining input certification data output from an external access device, determining whether the input certification data coincides with the certification data stored in said certification data storage area, and allowing acceptance of at least one of a storage device access command and a setting change command for rewriting the certification data when it is determined that the input certification data coincides with the certification data;

receiving the access command or the setting change command output by said access device while the acceptance of the access command and the setting change command is allowed;

accessing said storage device in accordance with the received access command, and supplying read-out data obtained from said storage device by this accessing to said access device; and obtaining new certification data output from said access device in accordance with the received setting change command, and rewriting the certification data stored in said certification data storage area into the new certification data obtained from said access device.

19. A computer readable recording medium storing a program which causes a computer to act as:

a storage device storing and supplying data in response to access and having a certification data storage area for rewritably storing certification data;

an access device having a function of outputting input certification data, and at least one of a storage device access command or a setting change command for rewriting the certification data, and a function of obtaining read-out data supplied in accordance with the access command; and a controller for receiving the input certification data output from said access device; determining whether the input certification data coincides with the certification data stored in said certification data storage area; allowing acceptance of the access command and the setting change command output by said access device when it is determined that the input certification data coincides with the certification data; receiving the access command or the setting change command output by said access device while the acceptance of the access command and the setting change command is allowed; accessing said storage device in accordance with the received access command and supplying the read-out data obtained from said storage device by this accessing to said access device; and obtaining new certification data output from said access device in accordance with the received setting change command and rewriting the certification data stored in said certification data storage area into the new certification data obtained from said access device.

20. A computer readable data signal representing program code embodied in a carrier wave which causes a computer to act as:

a storage device storing and supplying data in response to access and having a certification data storage area for rewritably storing certification data;

an access device having a function of outputting input certification data, and at least one of a storage device access command or a setting change command for rewriting the certification data, and a function of obtaining read-out data supplied in accordance with the access command; and a controller for receiving the input certification data output from said access device; determining whether the input certification data coincides with the certification data stored in said certification data storage area; allowing acceptance of the access command and the setting change command output by said access device when it is determined that the input certification data coincides with the certification data; receiving the access command or the setting change command output by said access device while the acceptance of the access command and the setting change command is allowed; accessing said storage device in accordance with the received access command and supplying the read-out data obtained from said storage device by this accessing to said access device; and obtaining new certification data output from said access device in accordance with the received setting change command and rewriting the certification data stored in said certification data storage area into the new certification data obtained from said access device.

* * * * *